United States Patent
Fujioka et al.

(10) Patent No.: US 7,316,159 B2
(45) Date of Patent: Jan. 8, 2008

(54) TIRE INFORMATION DETECTING DEVICE

(75) Inventors: Eiji Fujioka, Kariya (JP); Manabu Kato, Nagoya (JP); Katsuyoshi Shirai, Anjo (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/902,101

(22) Filed: Jul. 30, 2004

(65) Prior Publication Data

US 2005/0023896 A1    Feb. 3, 2005

(30) Foreign Application Priority Data

Jul. 31, 2003    (JP)    ............... 2003-283537

(51) Int. Cl.
*B60C 23/02*    (2006.01)
(52) U.S. Cl. ........................................ 73/146
(58) Field of Classification Search ........ 73/146–146.8
See application file for complete search history.

(56) References Cited

U.S. PATENT DOCUMENTS

| | | | |
|---|---|---|---|
| 4,657,289 A * | 4/1987 | Boyer ...................... 290/1 R |
| 4,866,982 A * | 9/1989 | Gault ........................ 73/146.5 |
| 5,996,408 A | 12/1999 | Burns et al. |
| 6,254,276 B1 | 7/2001 | Ouchi et al. |
| 6,518,877 B1 * | 2/2003 | Starkey et al. ............. 340/447 |
| 6,591,671 B2 * | 7/2003 | Brown ...................... 73/146.5 |
| 6,722,192 B2 * | 4/2004 | Benedict et al. ............. 73/146 |
| 6,820,476 B2 * | 11/2004 | Hirohama .................. 73/146.5 |
| 6,885,293 B2 * | 4/2005 | Okumura ................... 340/448 |
| 6,972,671 B2 * | 12/2005 | Normann et al. ........... 340/442 |
| 2003/0001566 A1 | 1/2003 | Tsuge et al. |
| 2003/0038716 A1 | 2/2003 | Piesinger |
| 2003/0093188 A1 * | 5/2003 | Morita et al. ................. 701/1 |
| 2003/0102966 A1 * | 6/2003 | Konchin et al. ............ 340/445 |
| 2003/0110851 A1 | 6/2003 | Tsujita |
| 2003/0115945 A1 * | 6/2003 | Tsujita ......................... 73/146 |
| 2004/0036590 A1 * | 2/2004 | Elsner et al. ............... 340/445 |
| 2004/0066288 A1 * | 4/2004 | Okumura ................... 340/445 |

FOREIGN PATENT DOCUMENTS

| | | |
|---|---|---|
| DE | 101 50 760 A | 8/2002 |
| FR | 2 807 362 A | 10/2001 |
| JP | 1997-240228 | 9/1997 |
| JP | 2000-18214 A | 4/2000 |
| JP | 2002-531318 A | 9/2002 |
| JP | 2003-2020 A | 1/2003 |
| JP | 2003-157485 A | 5/2003 |
| JP | 2003-182325 A | 7/2003 |

OTHER PUBLICATIONS

Japanese Office Action dated Jul. 12, 2007 with English translation.

* cited by examiner

*Primary Examiner*—Max Noori
(74) *Attorney, Agent, or Firm*—Sughrue Mion, PLLC

(57) ABSTRACT

A tire information detecting device includes detecting means for detecting a state quantity in a tire, transmitting means for transmitting a signal outputted from the detecting means, receiving means for receiving the signal transmitted from the transmitting means, the receiving means mounted at a vehicle body side, and a brake actuator adjusted to apply a braking force to the vehicle. The receiving means is positioned at a radially inner side from a major diameter of the brake actuator.

19 Claims, 6 Drawing Sheets

TIRE INFORMATION DETECTING DEVICE

CROSS REFERENCE TO RELATED APPLICATIONS

This application is based on and claims priority under 35 U.S.C. §119 with respect to a Japanese Patent Application 2003-283537, filed on Jul. 31, 2003, the entire content of which is incorporated herein by reference.

FIELD OF THE INVENTION

This invention generally relates to a tire information detecting device. More particularly, this invention pertains to a tire information detecting device, the receiving unit of which can reliably receive an output signal of a transmitting unit disposed on a wheel supporting a tire.

BACKGROUND

Conventionally, a tire information receiving device, which receives a signal outputted from a transmitting unit mounted at a tire wheel without being in contact with the transmitting unit, has been widely known. A type of this tire information receiving device is disclosed in JP9(1997)-240228A2. In this device, one end of a stay member is fixed to a hub at a vehicle side. One end of a stay member is equipped at the other end of the stay member. A receiving part is fixed at the other end of the stay member. As described above, the receiving part 5 is supported by the cantilevered stators that are fixed to the vehicle stationary portion. Further, the receiving part is mounted so as to be adjacent to an inner diameter portion of the tire wheel.

In a tire information receiving device which receives information of a tire state quantity such as an air pressure outputted from a transmitting part mounted at a disc wheel, recent developments have lead to stabilizing information receiving response and to developing mounting position and method of the receiving device so as to reduce the manufacturing cost.

A need exists for providing a tire information detecting device capable of reliably detecting information such as a tire air pressure.

SUMMARY OF THE INVENTION

According to an aspect of the present invention, a tire information detecting device includes detecting means for detecting a state quantity in a tire, transmitting means for transmitting a signal outputted from the detecting means, receiving means for receiving the signal transmitted from the transmitting means, the receiving means mounted at a vehicle body side, and a brake actuator adjusted to apply a braking force to the vehicle. The receiving means is positioned at a radially inner side from a major diameter of the brake actuator.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described hereinbelow in detail with reference to the accompanying drawings.

Figure 1:
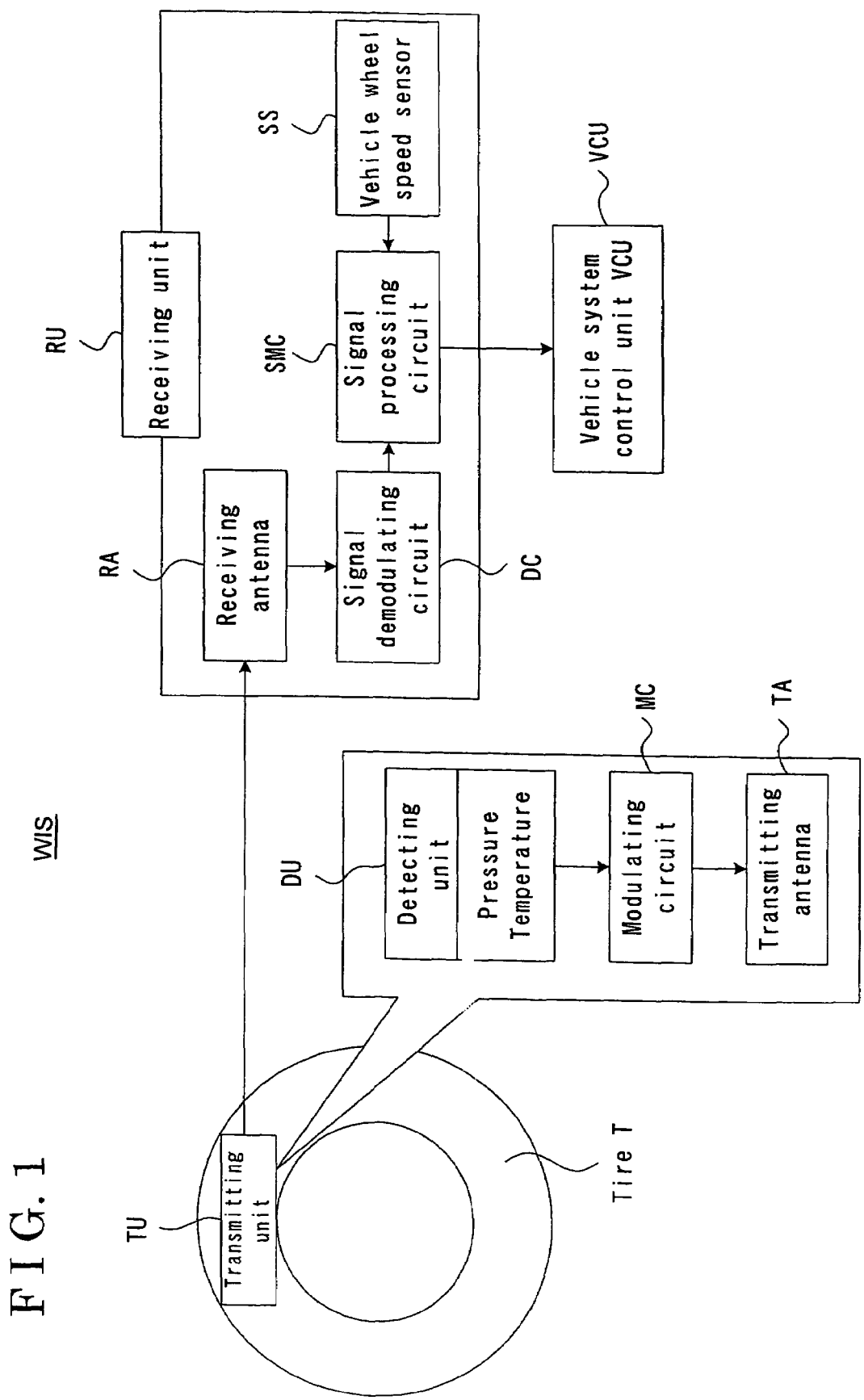
FIG. 1 is a block view illustrating a tire information detecting device applied for a vehicle control system according to an embodiment of the present invention.

As illustrated in FIG. 1, a tire information detecting device WIS is provided with a transmitting unit TU (i.e., transmitting means) mounted at or on a disc wheel DW (illustrated in FIG. 3) for a driving side vehicle wheel and a receiving unit RU (i.e., receiving means) mounted at a vehicle (main) body side. The transmitting unit TU includes a detecting unit DU (i.e., detecting means) for detecting a tire pressure and a tire temperature, each of which can be a parameter to directly detect a state quantity in a tire T. Therefore, the transmitting unit TU is adjusted to transmit the state quantity detected by the detecting unit DU to the receiving unit RU. The transmitting unit TU further includes a modulating circuit MC (i.e., signal modulating means) for modulating a signal associated with the detected state quantity, and a transmitting antenna TA for actually transmitting the modulated signal to an exterior portion. According to the embodiment of the present invention, the detecting unit DU detects the tire pressure and the tire temperature. However, the detecting unit DU can be added with functions for detecting a vehicle wheel acceleration and for detecting a power supply voltage supplied to the detecting unit DU.

The receiving unit RU includes a receiving antenna RA for receiving a signal transmitted from the transmitting unit TU, a signal demodulating circuit DC (i.e., signal demodulating means) for demodulating the received signal, a vehicle wheel speed sensor SS for detecting a vehicle wheel speed, and a signal processing circuit SMC for feeding the signals from the signal demodulating circuit DC and the vehicle wheel speed sensor SS to a vehicle system control unit VCU. According to the embodiment of the present invention, a widely used signal wire connects the vehicle system control unit VCU with the signal processing circuit SMC, whereby information can be transmitted between the vehicle system control unit VCU and the signal processing circuit SMC.

The transmitting antenna TA of the transmitting unit TU transmits the information such as the tire pressure and the tire temperature to the receiving unit RU at a predetermined time distance. In this case, in order to transmit the information detected by the detecting unit DU to the receiving unit RU, the signal representing the state quantity of the vehicle tire T is modulated by the modulating circuit MC. As non-limiting examples, the information fed from the transmitting antenna TA to the receiving unit RU corresponds to several types of frequencies appropriately set following vehicle types. Each of the frequencies can be 315 MHz, 433 MHz, 868 MHz, or the like. The frequencies to be applied for the tire information detecting device WIS do not have to be limited to the above and can be anything as far as they are defined in a frequency band recognized for each vehicle type.

According to the embodiment of the present invention, communication cycles between the transmitting unit TU and the receiving unit RU are defined independently pursuant to a vehicle stationary condition, a vehicle driving condition, and a vehicle abnormal condition. More particularly, while the vehicle has been under the stationary condition, it is sufficient to perform the communication therebetween only one time for a few hours. However, while the vehicle has been under the abnormal condition, it is preferable to control the communication therebetween to be performed at least once per second. The communication cycle is independently set in response to a condition of a vehicle system. The communication therebetween can be carried on in a manner that the receiving unit RU requests the transmitting unit TU to transmit the signal to the receiving unit RU, in a manner that the transmitting unit TU regularly transmits the signal to the receiving unit RU, or the like. The information (the signal) received by the receiving unit RU is demodulated by the signal demodulating circuit DC and is generated as a signal possessing tens of kilohertz of low frequency. The signal processing circuit SMC digitalizes the signal having the low frequency and transmits the digitalized signal to the vehicle system control unit VCU.

Figure 2:
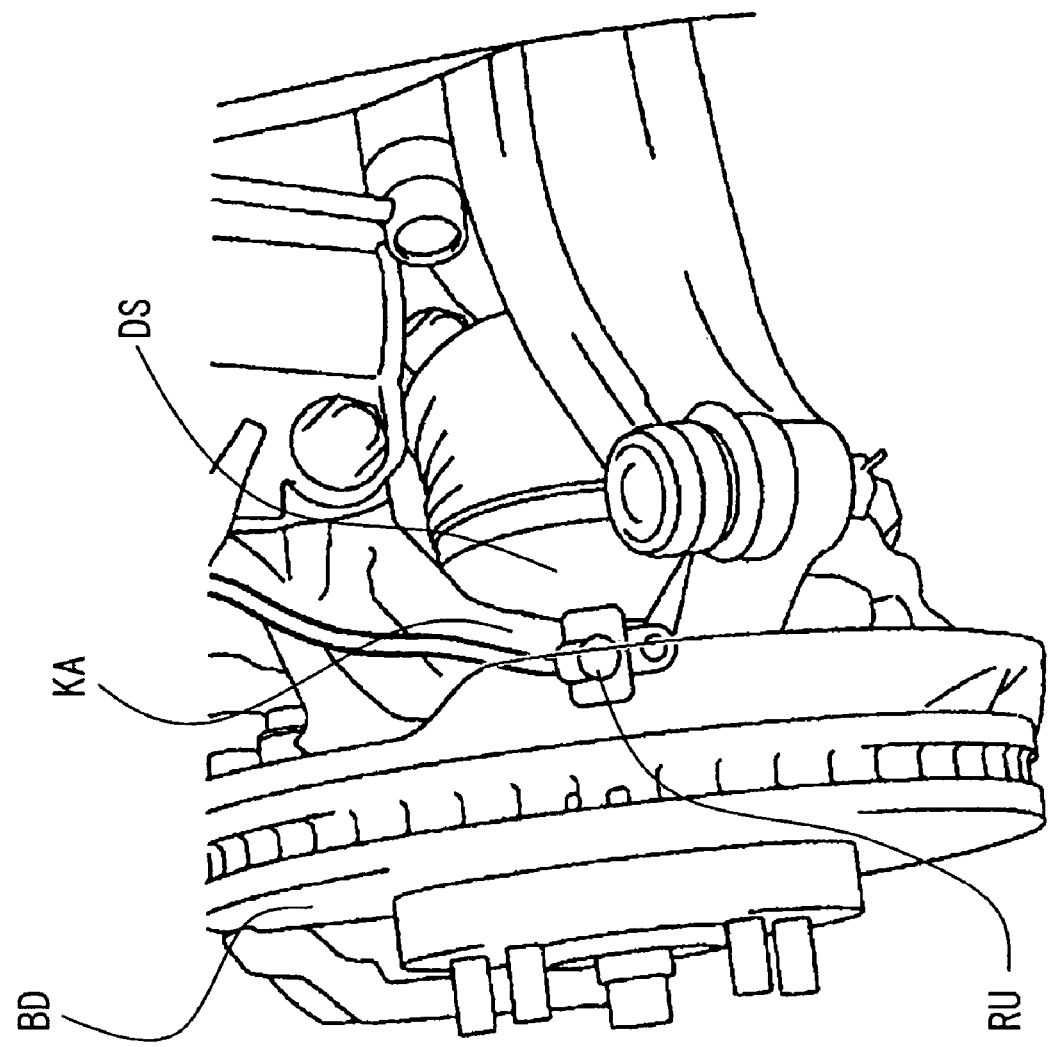
FIG. 2 is a view illustrating a receiving unit mounted at a vehicle side according to the embodiment of the present invention.

As illustrated in FIG. 2, the receiving unit RU is mounted at the vehicle side according to the embodiment of the present invention. The receiving unit RU is positioned at a radially inner side relative to a major diameter of a brake disc BD (i.e., a brake actuator), i.e., within a range corresponding to a diameter of the brake disc BD. The receiving unit RU is then fixed at a knuckle arm KA (i.e., a linking member) at a vehicle side. The knuckle arm KA is supported by a suspension (not illustrated). According to the embodiment of the present invention, the brake disc BD corresponds to the brake actuator. Alternatively, a drum brake can correspond to the brake actuator.

Figure 3:
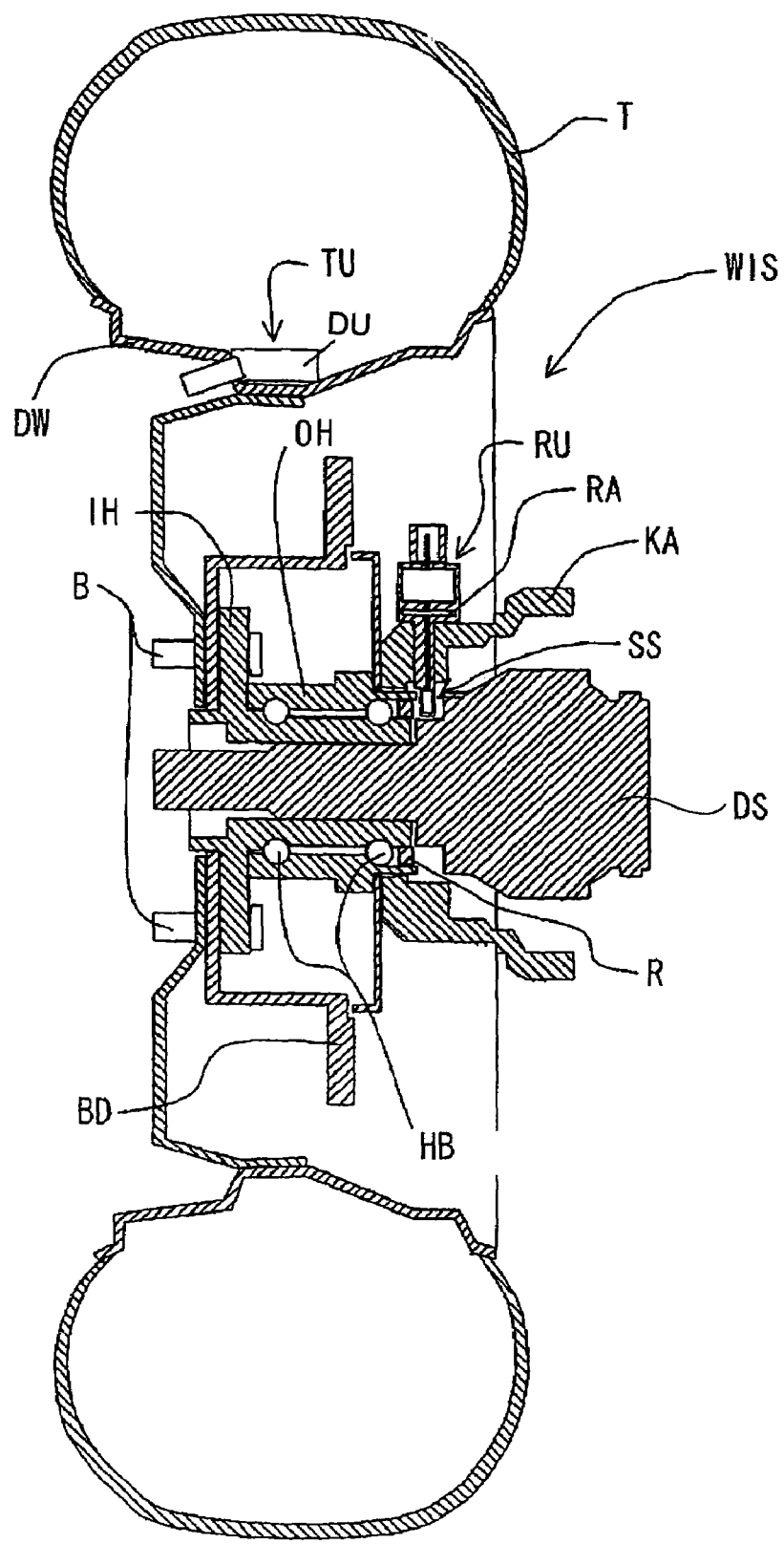
FIG. 3 is a cross sectional view illustrating a position of the receiving unit of the tire information detecting device mounted in the vicinity of a disc wheel according to the embodiment of the present invention.

As illustrated in FIG. 3, the transmitting unit TU having the detecting unit DU is mounted on or near the disc wheel DW. The transmitting unit TU is positioned in a space defined between an outer peripheral surface of the disc wheel DW and the tire T and is fixed to an intermediate position of the disc wheel DW. The intermediate position is defined approximately halfway of an axial dimension of the disc wheel DW extending substantially along a drive shaft DS. The drive shaft DS is connected to an inner hub IH. The brake disc BD is also connected to the inner hub IH. That is, the drive shaft DS, the inner hub IH and the brake disc BD are integrally connected by bolts B. The brake disc BD is jointed to the inner hub IH via the bolts B. Therefore, the disc wheel DW rotates substantially integrally with the drive shaft DS. Further, an outer hub OH is disposed surrounding the inner hub IH. There are plural hub bearings HB disposed between the inner hub IH and the outer hub OH, thereby allowing relative rotation therebetween. The outer hub OH is substantially integrally fixed to the knuckle arm KA. The hub bearings HB do not allow rotational force of the inner hub IH to be transmitted to the outer hub OH.

As described above, the knuckle arm KA is attached with the receiving unit RU. The receiving unit RU includes the receiving antenna RA, the signal demodulating circuit DC and the vehicle wheel speed sensor SS (i.e., vehicle wheel speed detecting means), all of which are integrally molded with resin. According to the embodiment of the present invention, a sensor with a Hall element is applied as the vehicle wheel speed sensor SS. Therefore, the rotational speed of the disc wheel DW can be obtained by the vehicle wheel speed sensor SS which detects a magnetic field generated in response to rotation of a rotor R. The rotor R is disposed between the inner hub IH and the outer hub OH. According to the embodiment of the present invention, the vehicle speed sensor SS is integrally formed at the receiving unit RU. Therefore, the number of components can be decreased. A manufacturing cost of the receiving unit RU, i.e., a manufacturing cost of the tire information detecting device WIS hence may be able to be effectively reduced. Further, an assembling man-hour may be able to be effectively reduced. Needless to say, the vehicle wheel speed sensor SS can be connected to the receiving unit RU via a connector.

As described above, when the receiving unit RU is mounted at the knuckle arm KA for the vehicle wheel, the receiving unit RU is positioned at the radially inner side from the major diameter of the brake actuator. In this case, the vehicle wheel is driven with a force transmitted from an engine via a transmission.

Figure 4:
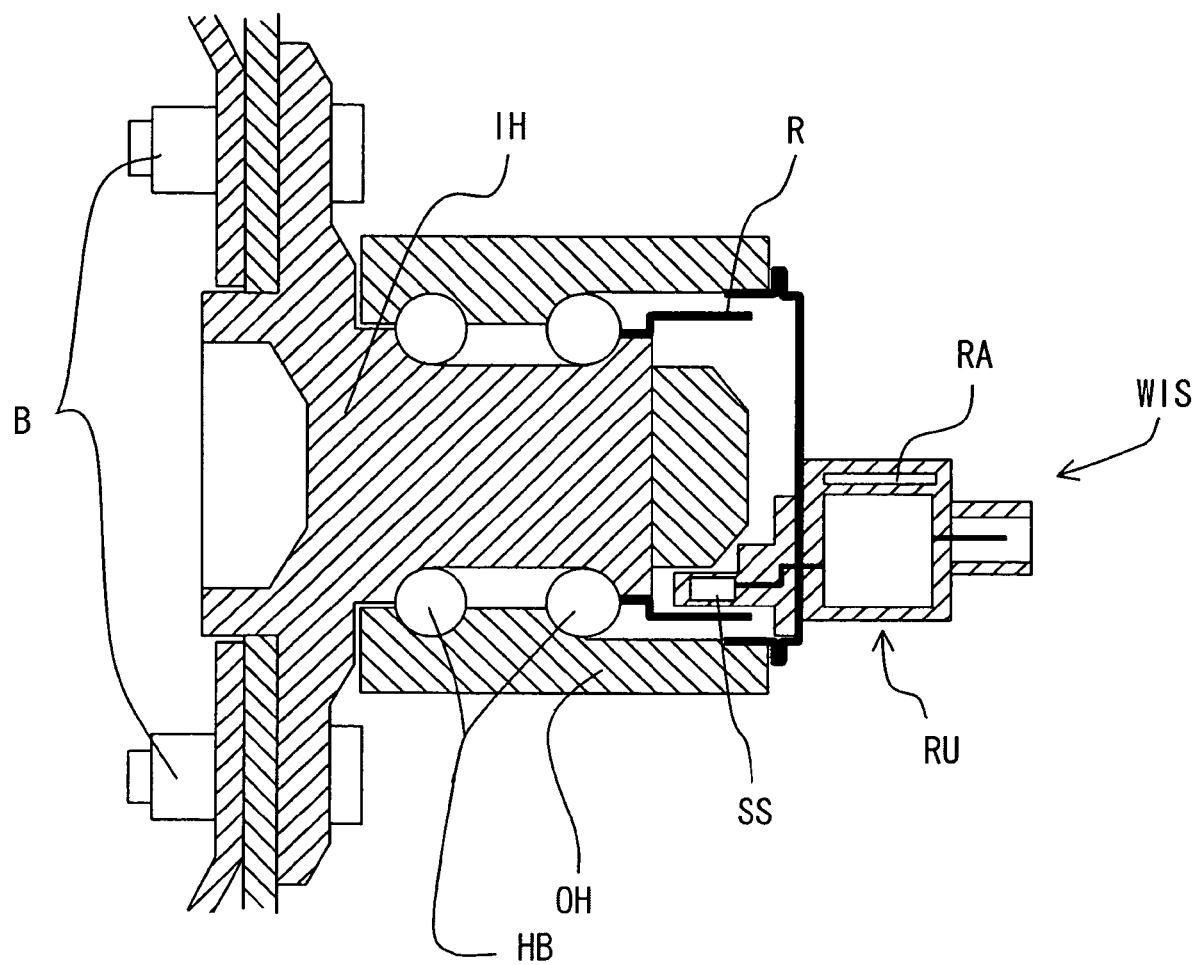
FIG. 4 is another cross sectional view illustrating the position of the receiving unit when the disc wheel mounted with the transmitting unit is equipped for a vehicle driven wheel.

FIG. 4 illustrates a positional relationship between the inner hub IH and the receiving unit RU at a time that the disc wheel DW with the transmitting unit TU is attached to a vehicle driven wheel. In this case, the space established at a time that the disc wheel DW with the transmitting unit TU is attached to a vehicle drive wheel as illustrated in FIG. 2, the space in which the drive shaft DS is positioned, is not established herein. Therefore, the receiving unit RU is disposed at an area substantially corresponding to a radial directional length of the inner hub IH, i.e., in the vicinity of the inner hub IH as illustrated in FIG. 4.

Next, following description will be given for describing a variation of a signal receiving response depending upon the mounting positions of the transmitting unit TU and the receiving unit RU with reference to FIGS. 5A, 5B, 6A and 6B.

Figure 5A:
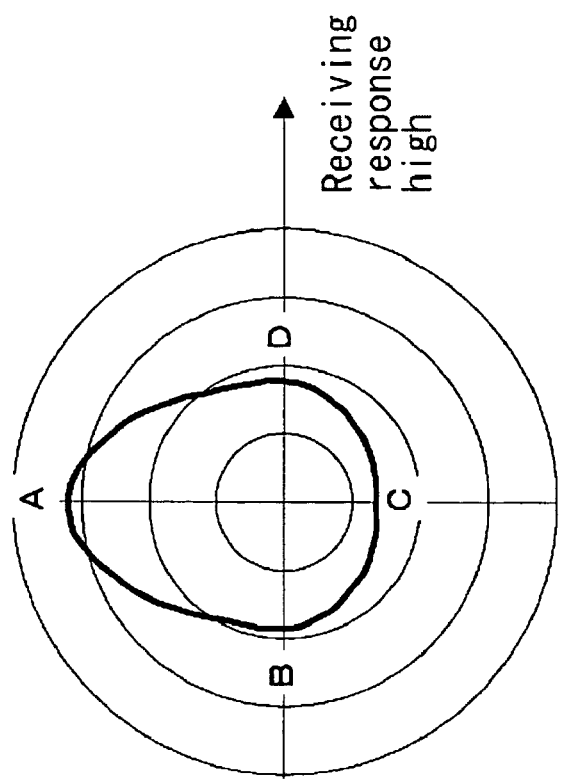
FIG. 5A is a view illustrating a conventional structure in which the transmitting unit is fixed at the disc wheel and the receiving unit is fixed at a tire housing side.
Figure 5B:
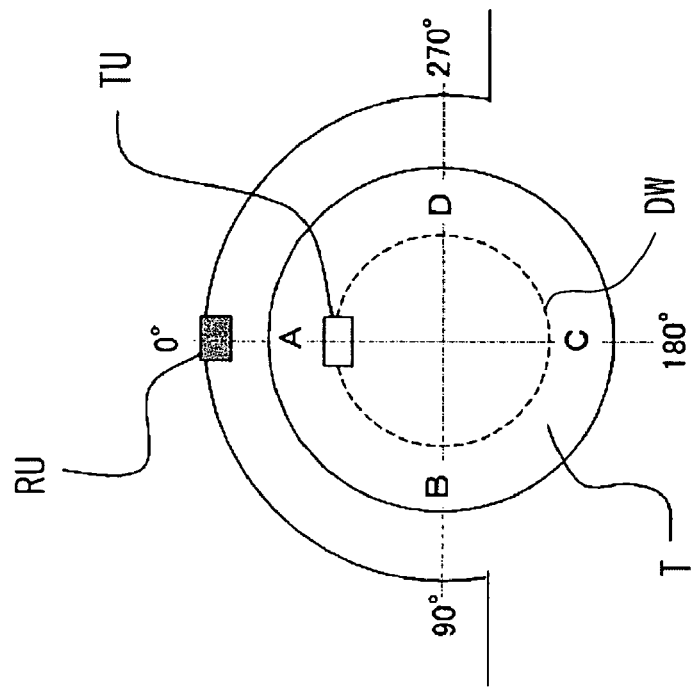
FIG. 5B is a characteristic view for explaining a variation of a signal receiving response of the receiving unit fixed at the tire housing side.
Figure 6A:
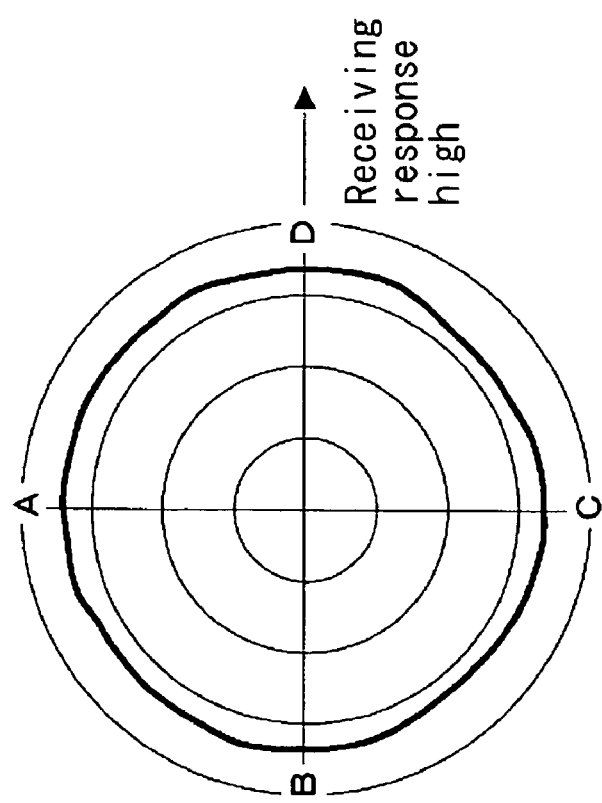
FIG. 6A is a view illustrating a structure in which the transmitting unit is fixed at the disc wheel and the receiving unit is mounted at a radially inner side from a major diameter of a brake actuator according to the embodiment of the present invention.
Figure 6B:
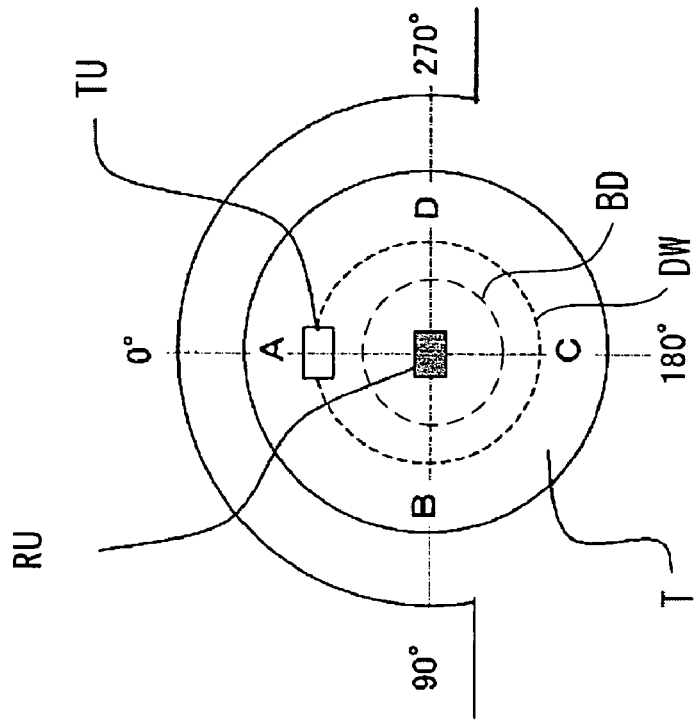
FIG. 6B is a characteristic view for explaining a variation of a signal receiving response of the receiving unit mounted at the radially inner side from the major diameter of the brake actuator.

When the vehicle runs, the signal receiving response of the receiving unit RU is explained depending upon each case where the transmitting unit TU is positioned at either A, B, C or D point, with reference to FIGS. 5B and 6B. According to the embodiment of the present invention, the receiving unit RU is positioned inside of the diameter direction of the brake actuator, i.e., in the vicinity of a rotational center of the tire T. Therefore, even if the transmitting unit TU rotates following the rotation of the tire T, a distance between the transmitting unit TU and the receiving unit RU does not vary so that the receiving response can be effectively prevented from fluctuation. That is, a distance between the transmitting unit TU and the receiving unit RU can be maintained at a substantially constant distance value regardless of the rotational position of the transmitting unit TU following the rotation of the tire T. As explained in FIGS. 5B and 6B, a stabilized signal receiving response can be obtained according to the structure illustrated in FIG. 6A.

If the receiving unit TU is not supported at a member such as the knuckle arm KA or the inner hub IH, but is supported by a cantilevered member, the receiving unit TU may be influenced by vibration applied at the cantilevered member. In this case, the receiving response of the receiving unit TU may fluctuate due to the vibration. Further, the cantilevered member may be damaged due to the vibration, wherein a reliability of this receiving device is not assured. Further, a mounting member may be required for fixing the receiving unit TU at the cantilevered member such that the number of components are increased and the assembling hours are also increased.

According to the embodiment of the present invention, the transmitting unit TU and the receiving unit RU are mounted in order to define polarized waves of the units TU and RU approximately in parallel with a rotational shaft of the tire T, respectively. In this case, a polarized area and directional characteristics of the receiving antenna RA can be maintained at a constant value even when the transmitting unit TU rotates, thereby enabling to obtain further preferable signal receiving response.

Further, according to the embodiment of the present invention, a magnetic field component of the wave transmitted from the transmitting unit TU is designed to be approximately in parallel with a rotational shaft of the tire T. Therefore, the polarized area in the responding direction of the receiving antenna RA can be approximately orthogonally oriented relative to the rotational shaft of the tire. That is, the receiving antenna RA is arranged to have the highest precision in sensing the magnetic field component of the wave transmitted from the transmitting unit TU. In this case, the polarized wave area and directional characteristics of the receiving antenna RA can be effectively maintained at a constant value relative to the rotating transmitting unit TU, thereby enabling to obtain further preferable receiving response.

The principles, the preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A tire information detecting device comprising:
a detector which detects an air pressure in a tire;
a transmitter which transmits a signal outputted from the detector;
a receiver which receives the signal transmitted from the transmitter, the receiver being mounted at a vehicle body side; and
a brake disc adjusted to apply a braking force to a vehicle,
wherein the receiver is positioned radially inward from an outer edge of the brake disc to prevent a distance between the receiver and the transmitter from varying widely and thereby assure stability of the receiver in receiving the signal from the transmitter, and
the receiver is provided with a vehicle wheel speed detector which detects a vehicle wheel speed.

2. A tire information detecting device according to claim 1, wherein the receiver is mounted at a linking member supporting a hub.

3. A tire information detecting device according to claim 1, wherein the transmitter is mounted at a wheel rim supporting the tire.

4. A tire information detecting device according to claim 1, wherein the detector, the transmitter and the receiver are mounted at a driven wheel.

5. A tire information detecting device according to claim 4, wherein the receiver is disposed radially inward from an outer edge of a hub.

6. A tire information detecting device according to claim 1, wherein the detector is included in the transmitter.

7. A tire information detecting device according to claim 1, wherein the transmitter includes a signal modulator which modulates the signal, and the receiver includes a signal demodulator which demodulates the signal.

8. A tire information detecting device according to claim 1, wherein the vehicle wheel speed detector is integrally formed with the receiver.

9. A tire information detecting device according to claim 1, wherein the receiver is mounted on a linking member at the vehicle body side.

10. A tire information detecting device comprising:
a detector which detects at least one of an air pressure, an air temperature in the tire, a vehicle wheel acceleration and a power supply voltage supplied to the detector;
a transmitter which transmits a signal outputted from the detector;
a receiver which receives the signal transmitted from the transmitter, the receiver being mounted at a vehicle body side; and
a drum brake adjusted to apply a braking force to a vehicle,
wherein the receiver is positioned radially inward from an outer edge of the drum brake to prevent a distance between the receiver and the transmitter from varying widely and thereby assure stability of the receiver in receiving the signal from the transmitter, and
the receiver is provided with a vehicle wheel speed detector which detects a vehicle wheel speed.

11. A tire information detecting device comprising:
a detector which detects an air temperature in a tire;
a transmitter which transmits a signal outputted from the detector;
a receiver which receives the signal transmitted from the transmitter, the receiver being mounted at a vehicle body side; and
a brake disc adjusted to apply a braking force to a vehicle,
wherein the receiver is positioned radially inward from an outer edge of the brake disc to prevent a distance between the receiver and the transmitter from varying widely and thereby assure stability of the receiver in receiving the signal from the transmitter, and
the receiver is provided with a vehicle wheel speed detector which detects a vehicle wheel speed.

12. A tire information detecting device according to claim 11, wherein the receiver is mounted at a linking member supporting a hub.

13. A tire information detecting device according to claim 11, wherein the transmitter is mounted at a wheel rim supporting the tire.

14. A tire information detecting device according to claim 11, wherein the detector, the transmitter and the receiver are mounted at a driven wheel.

15. A tire information detecting device according to claim 14, wherein the receiver is disposed radially inward from an outer edge of a hub.

16. A tire information detecting device according to claim 11, wherein the detector is included in the transmitter.

17. A tire information detecting device according to claim 1, wherein the transmitter and the receiver communicate via radio waves.

18. A tire information detecting device according to claim 10, wherein the transmitter and the receiver communicate via radio waves.

19. A tire information detecting device according to claim 11, wherein the transmitter and the receiver communicate via radio waves.

* * * * *